United States Patent
Ko et al.

(10) Patent No.: US 7,171,081 B1
(45) Date of Patent: Jan. 30, 2007

(54) PLUG-IN COUPLER TO CONVERT THE TRANSCEIVER (TRANSMITTER/RECEIVER, TX/RX) TRANSMISSION INTO A BI-DIRECTIONAL FIBER

(75) Inventors: Jimmy Ko, San Leandro, CA (US);
Tom Yang, San Leandro, CA (US);
Kevin Tseng, San Leandro, CA (US)

(73) Assignee: Lightech Fiberoptics, Inc., San Leandro, CA (US)

( * ) Notice: Subject to any disclaimer, the term of this patent is extended or adjusted under 35 U.S.C. 154(b) by 250 days.

(21) Appl. No.: 10/099,377

(22) Filed: Mar. 14, 2002

(51) Int. Cl.
*G02B 6/26* (2006.01)

(52) U.S. Cl. ............................. 385/39; 385/53; 385/31

(58) Field of Classification Search ................ 385/24, 385/27, 31, 33, 34, 37, 47, 60, 72, 78
See application file for complete search history.

(56) References Cited

U.S. PATENT DOCUMENTS

| | | | |
|---|---|---|---|
| 4,776,660 A | 10/1988 | Mahlein et al. | 350/96.16 |
| 4,955,014 A * | 9/1990 | Kuppers et al. | 398/42 |
| 5,031,188 A | 7/1991 | Koch et al. | 372/50 |
| 5,144,637 A | 9/1992 | Koch et al. | 372/50 |
| 5,673,342 A | 9/1997 | Nelson et al. | 385/24 |
| 5,712,864 A | 1/1998 | Goldstein et al. | 372/50 |
| 6,289,148 B1 | 9/2001 | Lin et al. | 385/24 |
| 6,289,155 B1 | 9/2001 | Wade | 385/37 |
| 6,339,663 B1 | 1/2002 | Leng et al. | 385/24 |
| 6,735,361 B2 * | 5/2004 | Gilliland et al. | 385/37 |

2002/0110313 A1 * 8/2002 Anigbo et al. ................ 385/24

FOREIGN PATENT DOCUMENTS

EP    164170 A2 * 12/1985

OTHER PUBLICATIONS

Sorin et al. "Highly selective evanescent modal filter for two-mode optical fibers". Optics Letters, vol. 11, No. 9, pp. 581-583, Sep. 1986.*
Harmonic Inc. HW 1000 CWDM Coupler.
Canoga Perkins WA-2 Wavelength Division Multiplexer.
Oplink Communications, Inc. HWDM Series and MWDM 1325 Series Couplers.

(Continued)

*Primary Examiner*—Sarah Song
(74) *Attorney, Agent, or Firm*—Saile Ackerman LLC; Stephen B. Ackerman; Billy Knowles (57) ABSTRACT

A bi-directional light signal separation device that separates light signals into the component incoming and outgoing light signals has a a female connector that is connected to a near end of a first fiber optic cable conveying the bi-directional light signal. A light signal separation device connected to the female connector to separate the bi-directional light signal into the individual incoming and outgoing light signals. A plurality of second type connectors connected to convey the individual incoming or outgoing light signals. The light signal separation device has a plurality of light filters and reflectors such that a light signal incoming to the second type connector is transmitted through the filter and conveyed to the female connector and such that the light signal incoming from the first connector and reflected by the light filter is reflected and conveyed to be outgoing on the second connector.

9 Claims, 8 Drawing Sheets

OTHER PUBLICATIONS

Koncent Inc. WDC Series WDM Couplers. 2001.

SPIE Web, De Reports, Oct. 1997, An Interview with Jean-PierreLaude, pp. 1-3, "History and Technology of Wave Length Division Multiplexing".

"1.3/1.55 Microns Duplex-Diplex Optical Transmission: The Brazilian Technology," Celaschi et al., Telecommunications Symposium, 1990. Its '90 Symposium Record, 5BT/IEEE Int'l. pp. 454-457, Sep. 1990, Rio de Jameiro, Brazil.

"A 1.3/1.55 µm Wavelength-Division Multiplexing Optical Module Using a Planar Lightwave Circuit for Full Duplex Operation," Hashimoto et al., Journal of Lightwave Technology, IEEE, Nov. 2000, vol. 18, Issue:11, pp. 1541-1547.

Stratos Lightwave, Inc.

Finisar Corporation. Jun. 2000.

"Bi-directional Single Fiber Links for Base Station Remote Antenna Feeding," Steiner et al., European Conf. on Net-works, Optical comm. NOC 2000, Jun. 6-9, 2000, Stullgart, Germany.

Issls 2000, XIIIth Int'l Sump-on Services and Local Access, Stockholm, Sweden, Jun. 18-23, 2000, "2:1 Arrayed-Waveguide Grating Basedd WDM Access Networks : An Evolutionary Multi-Gb/s Upgrade Path".

"Planar Lightwave Circuit Platform with Coplanar Waveguide for Opto-Electronic Hybrid Integration".

S. Mino et al., Journal of Lightwave Technology, IEEE, Dec. 1995, vol. 13, Issue 12, pp. 2320-2326.

"1310/1550nm, Single Mode, WDM Coupler", Koncent Communications Inc. 39 Fuxing Road, P.O. Box 1108 Fuzhou,Fujian 350014, P.R. China, found www.koncent.com Mar. 19, 2002.

1310/1550nm Micro-Optic WDM—MWDM1315 Series, Oplink Communications, Inc., 3469 North First St., San Jose, CA 95134-1803, found www.oplink.com Jan. 31, 2002.

"Optical Passive Devices—HW 1000", Harmonic Inc., 549 Baltic Way, Sunnyvale, CA 94089, found www.harmonicinc.com Jan. 30, 2002.

"Wavelength Division Multiplexer—ModelWA-2", Canoga Perkins Corporation, 20600 Prairie Street, Chatsworth, CA 91311, found www.canogaperkins.com Jan. 30, 2002.

"Finisar Optical SFP Transceiver Modules—Gigabit-rate Small Form Factor Pluggable", Finisar Corporation, 1308 Moffett Park Drive, Sunnyvale, CA 94089-1133, Jun. 2000.

"SPLC-20-7-X-XL Optical ATM OC-48-3.3V—Small form Factor Pluggable (SFP)—2.48/GBaud Transceiver Module", Stratos International, Inc., 7444 W. Wilson Avenue, Chicago, Illinois 60706-4549. found www.stratoslightwave.com Jan. 30, 2002.

* cited by examiner

PLUG-IN COUPLER TO CONVERT THE TRANSCEIVER (TRANSMITTER/RECEIVER, TX/RX) TRANSMISSION INTO A BI-DIRECTIONAL FIBER

BACKGROUND OF THE INVENTION

1. Field of the Invention

This invention relates to transmission and reception of electromagnetic signals in a medium. More particularly this invention relates to the multiplexing and demultiplexing of multiple signals from a cable. Even more particularly this invention relates to the separation simultaneously bi-directional light signals into its component incoming and outgoing signals.

2. Description of Related Art

Wavelength division multiplexing (WDM) is rapidly becoming the means for expanding the bandwidth or amount of information (data, telephony, or video) transported on fiber optic cables. Originally, the data modulated a single frequency or wavelength of light for transmission. The bandwidth being increased by employing time domain multiplexing (TDM) of the data signals. As the capacity of the installed base of the fiber optic cables became saturated with transmission of data, a method for increasing the capacity of the fiber optic cable became desirable.

The method developed to increase bandwidth use of fiber optic cable was wavelength division multiplexing. Light signals of different wavelengths are applied to a single fiber optic cable. The easiest, most cost effective method for wavelength division multiplexing is termed coarse wavelength division multiplexing (CWDM). Coarse wavelength division multiplexing employs light signal wavelengths that are widely separated to minimize light signal interaction or cross talk and allow the use of light signal separation techniques that are relatively simple. The light signal wavelengths are chosen such that the materials utilized have minimum dispersion and attenuation. The current preferred light signal wavelengths are 850 nm, 1310 nm, and 1550 nm.

Implementation of the wavelength domain multiplexing requires a multiplexer to combine the light signal wavelength for transmission of the combined light signals and a demultiplexer to separate the received light signals into the individual component light signals. Further, it is desirable to simultaneously transmit and receive signals from both ends of a fiber optic cable. This requires a combination of a multiplexer and demultiplexer to be present at both ends of the fiber optic cable. In fiber optic communication systems using two light signal wavelength such as 1310 nm and 1550 nm, the multiplexer/demultiplexer that separates the two bi-directional light signals is referred to as diplexers. Such companies as Koncent, Inc., Oplink Communications, Inc., and Harmonic, Inc. market diplexers or coarse wavelength division multiplexers that combine monochromatic light signals in the 1310 nm and 1550 nm wavelength range to form a bi-directional polychromatic light of the combined wavelengths and separate the bi-directional polychromatic light into the separate 1310 nm and 1550 nm wavelength light signals.

U.S. Pat. No. 5,673,342 (Nelson, et al.) teaches an optical fiber communication system having an optical fiber filter that can be manufactured at low cost and that can be conveniently incorporated into the system, substantially like a conventional fiber jumper. The filter comprises a length L of axially uniform optical fiber selected to have substantially no loss (e.g., <1 dB) at a wavelength $\lambda_1$, and to have relatively high loss (e.g., >20 dB) at a wavelength $\lambda_2$. The length L will typically be less than 100 m. In one embodiment the optical fiber is a single mode optical fiber at $\lambda_1$ (e.g., 1.3 μm) that does not have a guided mode at $\lambda_2$ (e.g., 1.55 μm). In another embodiment the fiber contains a dopant that does not substantially absorb radiation of wavelength $\lambda_1$, but substantially absorbs at $\lambda_2$. In the second embodiment, $\lambda_1$ can be greater than $\lambda_2$.

U.S. Pat. No. 6,289,148 (Lin, et al.) teaches a free-space micro-mirror wavelength add/drop multiplexer with full connectivity for two-fiber ring networks. The free-space nature of the switch mirrors allows use of the front and back sides of the mirrors for reflecting signals. According to one embodiment of the present invention a wavelength add/drop multiplexer is provided in which micro machined switch mirrors are arranged in a polygonal (e.g., hexagonal) geometry, which allows full connectivity. According to one embodiment a wavelength add/drop multiplexer is provided for deployment in a unidirectional two-fiber optical network including service and protection fiber routes. According to this embodiment the wavelength add/drop multiplexer includes a first input port for receiving a wavelength division multiplexed signal from the service fiber route and a second input port for receiving a wavelength division multiplexed signal from the protection fiber route. The wavelength add/drop multiplexer also includes a first output port for transmitting a wavelength division multiplexed signal to the service fiber route, a second output port for transmitting a wavelength division multiplexed signal to the protection fiber route, a third input port for receiving local signals from a local access port and a third output port for dropping signals to a local access port. The wavelength add/drop multiplexer further includes a reconfigurable switching matrix comprising a plurality of free-space micro mirrors, for performing routing of signals from the various input ports to the various output ports. According to an alternative embodiment a wavelength add/drop multiplexer is provided for deployment in a bi-directional two-fiber optical network including two service/protection routes.

U.S. Pat. No. 6,289,155 (Wade) discusses wavelength division multiplexing/demultiplexing devices using dual high index of refraction crystalline lenses. The wavelength division multiplexing device comprises a crystalline collimating lens for collimating a plurality of monochromatic optical beams, a diffraction grating for combining the plurality of collimated, monochromatic optical beams into a multiplexed, polychromatic optical beam, and a crystalline focusing lens for focusing the multiplexed, polychromatic optical beam.

U.S. Pat. No. 6,339,663 (Leng, et al.) provides a bi-directional wavelength division multiplexed optical communication system having bi-directional optical service channels. The bi-directional WDM optical communication system includes a bi-directional optical waveguide configured to carry a bi-directional optical communication signal comprising counter propagating WDM optical signals. Each WDM optical signal includes plural optical channels and an optical service channel. A bi-directional optical add-drop multiplexer optically communicates with the waveguide. A first optical service channel selector optically communicates with the first bi-directional optical add-drop multiplexer input/output port. The first optical service channel selector is configured to separate the first optical service channel from the first WDM optical communication signal such that the first WDM signal enters the first input/output port of the bi-directional optical add-drop multiplexer and the first optical service channel is routed to a service channel module. Similarly, a second optical service channel selector optically communicates with the second input/output port of the bi-directional optical add-drop multiplexer and routes the second optical service channel to a service channel module.

U.S. Pat. No. 4,776,660 (Mahlein, et al.) teaches a light branching element or diplexer comprising a first bi-directional light connection and a second and third unidirectional light connection. The unit is formed by a block having a straight surface groove with an embedded glass fiber which fiber is interrupted by a partially transmissive mirror lying on a slanting plane relative to the axis of the fiber. The light sensitive location of a light receiving semiconductor element is secured to the block adjacent to the mirror and the plane of the mirror is selected so that its normal extends out of the block at an angle of incidence smaller than 45° to the axis of the fiber to reduce reflections from the semiconductor member back to the mirror and into the fiber.

U.S. Pat. No. 5,144,637 and U.S. Pat. No. 5,031,188 (Koch, et al.) present a diplex lightwave transceiver that achieves full duplex light wave communications. The diplex transceiver is realized in a semiconductor photonic integrated circuit having an inline interconnecting waveguide integral with the transmitting and receiving portions of the transceiver. Semiconductor lasers and detectors operating at different wavelengths permit diplex or wavelength-division-multiplexed operation. In the transceiver, light wave signals from the laser propagate through the detector without interfering with the detector operation or the light wave signals being detected.

U.S. Pat. No. 5,712,864 (Goldstein, et al.) discusses a semiconductor photonic diplex transceiver. The photonic diplex transceiver includes a laser to generate a first optical signal having a certain wavelength and a photodetector to detect a second optical signal having another wavelength. The diplex transceiver also includes an absorber of the first signal disposed between the laser and the detector, which form integral parts of an optical waveguide. The laser generates the first signal in the form of a continuous wave and is disposed between the absorber and a selective modulator of the first signal. This reduces the problems of optical and electrical crosstalk between the transmit and receive functions.

"Bi-directional Single Fiber Links for Base Station Remote Antenna Feeding," Steiner et al., European Conference on Networks & Optical Communications NOC 2000, Jun. 6–9, 2000, Stuttgart, Germany, discusses a bi-direction module employing a WDM beam splitter.

"1.3/1.55 Microns Duplex-Diplex Optical Transmission: The Brazilian Technology," Celaschi, et al., Telecommunications Symposium, 1990. ITS '90 Symposium Record, SBT/IEEE International, pp. 454–457, September 1990, Rio de Janeiro, Brazil, presents results from the first experimental Brazilian route in which two separate optical channels have been combined in both duplex and diplex transmission. The experiments were demonstrated over 18 km of standard single-mode fiber using 1.29 and 1.52 micron edge-emitting laser diodes at 34 Mbit/s. The optical emitters and detectors were linked to the single mode fiber through specially designed wavelength division multiplexing couplers. The results indicate that either duplex or diplex transmission can be implemented in any installed standard single mode route up to 40 km.

"A 1.3/1.55 µm Wavelength-Division Multiplexing Optical Module Using a Planar Lightwave Circuit for Full Duplex Operation," Hashimoto, et al.", Journal of Lightwave Technology, IEEE, November 2000, Volume: 18 Issue: 11, pp. 1541–1547, discusses development of a hybrid integrated optical module for 1.3/1.55 µm wavelength-division multiplexing (WDM) with full-duplex operation. The optical circuit was designed to suppress the optical and electrical crosstalk using a wavelength division multiplexing filter, and an optical crosstalk of −43 dB and an electrical crosstalk of −105 dB were achieved with a separation between the transmitter laser diode and the receiver photodiode of more than 9 mm.

"Planar Lightwave Circuit Platform with Coplanar Waveguide For Opto-Electronic Hybrid Integration," Mino, et al., Journal of Lightwave Technology, IEEE, December 1995, Volume: 13 Issue: 12, pp. 2320–2326 describes a planar lightwave circuit (PLC) platform constructed on a silica-on-terraced-silicon (STS) substrate for opto-electronic hybrid integration. This platform consists of an embedded silica PLC region, a terraced silicon region for optical device assembly, and a high-speed electrical circuit region. In the electrical circuit region, the coplanar waveguides (CPW) are prepared on a thick-silica/silicon substrate. This structure reduces the propagation loss of the CPW drastically to 2.7 dB/cm at 10 GHz, because the loss tangent (tan $\Delta$) of the dielectric constants of silica is much smaller than that of silicon.

SUMMARY OF THE INVENTION

An object of this invention is to provide a device for separation of bi-directional light signal into the component incoming and outgoing light signals.

To accomplish this object, a fiber optical signal separation apparatus has a substrate onto which a female type connector is attached. The female type connector is connected to a near end of a first fiber optic cable conveying the bi-directional light signal. A light signal separation device is affixed to the substrate and connected to the female type connector to separate the bi-directional light signal into the individual incoming and outgoing light signals. A plurality of second type connectors are attached to the substrate and connected convey the individual incoming or outgoing light signals.

The fiber optic signal separation apparatus has a first graded index lens placed between the female type connector and the light signal separation device to concentrate the bi-directional light signal prior to conveyance between the female connector and the light signal separation device. A first ferrule containing a fiber optic core is placed between the female type connector and the first graded index lens to transfer the bi-directional light signal between the female type connector and the first graded index lens.

The fiber optic signal separation apparatus has a plurality of second graded index lenses. Each second graded index lens is placed between one of the plurality of second type connectors and the light signal separation device to concentrate one of the individual incoming or outgoing light signals. The fiber optic signal separation apparatus further has a plurality of second ferrules. Each of second ferrules contains a fiber optic core and is placed between one of the plurality of second graded index lenses and one of the plurality of second type connectors to transfer one of the individual incoming or outgoing light signals.

The light signal separation device is comprised of a plurality of light filters attached to the substrate. Each light filter is aligned such that light signals incoming from the female type connector are reflected by the light filter and aligned with one of the second type connectors such that a light signal incoming to the second type connector is transmitted through the filter and conveyed to the female type connector. The light signal separation device also has a plurality light reflectors attached to the substrate. Each light reflector is aligned with the light filter and with one of the second type connectors such that the light signal incoming from the female type connector and reflected by the light filter is reflected and conveyed to be outgoing on the second type connector.

Alternately, the light signal separation device has a plurality of light couplers attached to the substrate. Each light coupler has a first port connected to the female type connector to convey the bi-directional light signal. A second port is connected to one of the second type connectors to receive the incoming light signal and convey the incoming light signal to the female type connector for transmission to the first fiber optic cable. A third port is connected to one of the second connectors to transmit an incoming signal of the bi-directional signal from the female type connector to one of the second fiber optic cables. A separation coupler directs the incoming light signal from one of the second connectors to the female type connector and to direct the incoming light from the first female connector to another of the second connectors.

DETAILED DESCRIPTION OF THE INVENTION

Wide bandwidth networks such as those used to communicate data, telephony, and video within a metropolitan area have routers that provide steering of the wideband data, telephony, and video signals between nodes of the network. The router systems are composed of switch cards that receive, route, and retransmit the wideband data, telephony, and video signals between the nodes of the network. Generally, the switch cards currently have only an electronic interface for the transmitters and receivers of the links to carry the wideband data, telephony, and video signals. To provide for fiber optic cabling as the physical link from the nodes of the network to the switch cards, fiber optic transmitters and receivers are placed at the interface of the switch cards and the fiber optic cabling.

Small form factor pluggable transceiver modules now manufactured by such companies as Stratos Lightwave, Inc. and Finisar Corporation provide optical transmitters and receivers that couple the wideband data, telephony, and video signals modulated on a light signal to the fiber optic cables. These small form factor pluggable transceiver modules are packaged such that they have electrical connectors that mate with a single port of the switch and fiber optic connectors that mate with the fiber optic cables. The spacing of the small form factor pluggable transceiver modules is such that all ports present on the switch have a small form factor pluggable transceiver module connected to each port. The switches transmit the wideband data, telephony, and video signals to be routed to a port on one cable while receiving the wideband data, telephony, and video signals on a second port. This forces each switch of a router to have two cables (one transmit cable and one receive cable) connected to each port of the switch. In networks where there is increasing demand for the wideband data, telephony, and video signals, increasing the number of ports of the switch and the number of nodes on the network requires doubling the number fiber optic cables installed in the network.

As described above, wavelength domain multiplexing allows light signals of multiple wavelengths ($\lambda$) to be transferred on a single fiber optic cable. The small form factor pluggable transceiver modules as described do not have a facility for providing the wavelength domain multiplexing to reduce the required number of fiber optic cables as the network increase in the number of nodes. A diplexer, as described above, provides the combination and separation of transmitted and received light signals to allow the simultaneous bi-directional transmission light signals on a single fiber optic cable.

Figure 1:
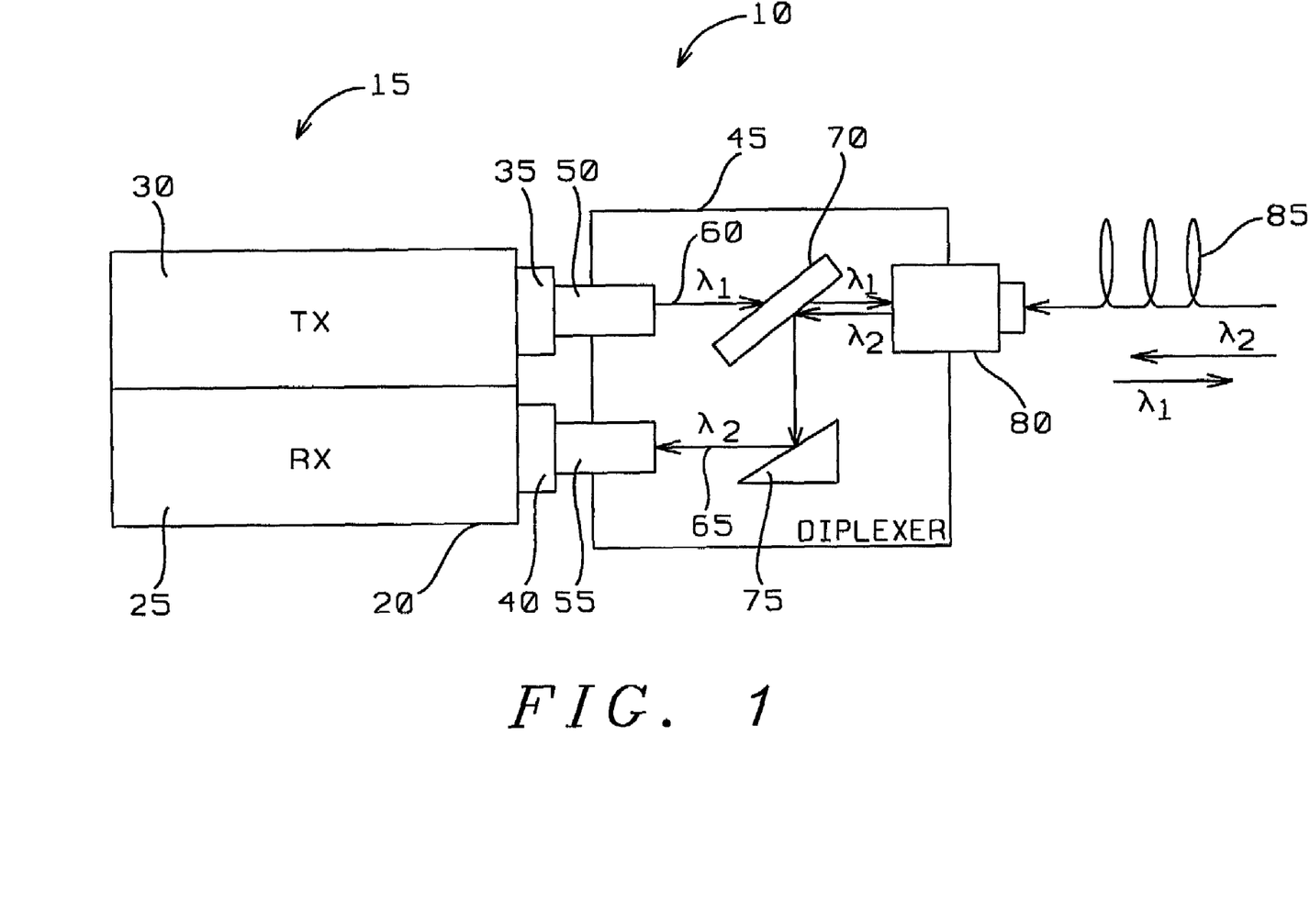
FIG. 1 is a schematic diagram illustrating a first embodiment a diplexer of this invention.

Refer now to FIG. 1 for a description of the diplexer of this invention. The diplexer 10 is connected to the small form factor pluggable transceiver module 15 to couple the light signals $\lambda_1$ 60 and $\lambda_2$ 65 from and to the transceiver module 15. The light signals $\lambda_1$ 60 and $\lambda_2$ 65 are modulated with the wideband data, telephony, and video signals from the switch or node originating the wideband data, telephony, and video signals. The small form factor pluggable transceiver module 15 has a receiver 25 that receives the light signal $\lambda_2$ 65 from the fiber optic cable 85 and a transmitter 30 that transmits the light signal $\lambda_1$ 60 to the fiber optic cable 85. The diplexer 10 providing the combination and separation of the signals to allow the simultaneous bi-directional transmission of the light signals $\lambda_1$ 60 and $\lambda_2$ 65.

The connectors 50 and 55 are attached to a substrate 45. The connector 50 is aligned to be inserted to mate with the connector 35 of the transmitter 30 and the connector 55 is aligned to be inserted to mate with the connector 40 of the receiver 25. The optical filter 70 is mounted on the substrate. The optical filter 70 is constructed to be transmissive to the wavelength of the light signal $\lambda_1$ 60 and reflective to the wavelength to the light signal $\lambda_2$ 65. The optical filter is then aligned with the connector 50 and the female connector 80 to allow the light signal $\lambda_1$ 60 to pass through the optical filter 70 to the female connector 80 and into the fiber optic cable 85 for transmission to the receiver at the distal end of the fiber optic cable 85.

A mirror 75 that is reflective to the wavelength of the light signal $\lambda_2$ 65 is attached to the substrate and aligned with the connector 55 to transmit the light signal $\lambda_2$ 65 through the connector 55 to the receiver 25. The filter 70 and the mirror 75 are oriented and aligned with respect to each other to allow the light signal $\lambda_2$ 65 transferred from the fiber optic cable 85 through the female connector 80 to reflect from filter 70 to the mirror 75 and from the mirror 75 to the connector 55.

The diplexer 10 of this invention is packaged and contained within the substrate 45 and has no "pig tail" fiber optic cables as the diplexers of the prior art. The diplexer 10 of this invention allows the fiber optic cable 85 installed to connect another node or switch to the node or switch connected to the small form factor pluggable transceiver module 15 to be easily installed. No special connectors are required to be affixed to the diplexer 10 as with the diplexers of the prior art.

The optical filter 70 of the diplexer 10 is designed such that the wavelength of the light signals $\lambda_1$ 60 and $\lambda_2$ 65 are different depending on the wavelength of the light signals being transmitted or being received. In coarse wavelength division multiplexing as currently practiced the common wavelengths are 1310 nm and 1550 nm. The combinations of the wavelengths transmitted and reflected by the optical filter are shown in Table 1.

TABLE 1

| $\lambda_1$ 60 | $\lambda_2$ 65 |
|---|---|
| 1310 nm | 1550 nm |
| 1550 nm | 1310 nm |

Figure 2:
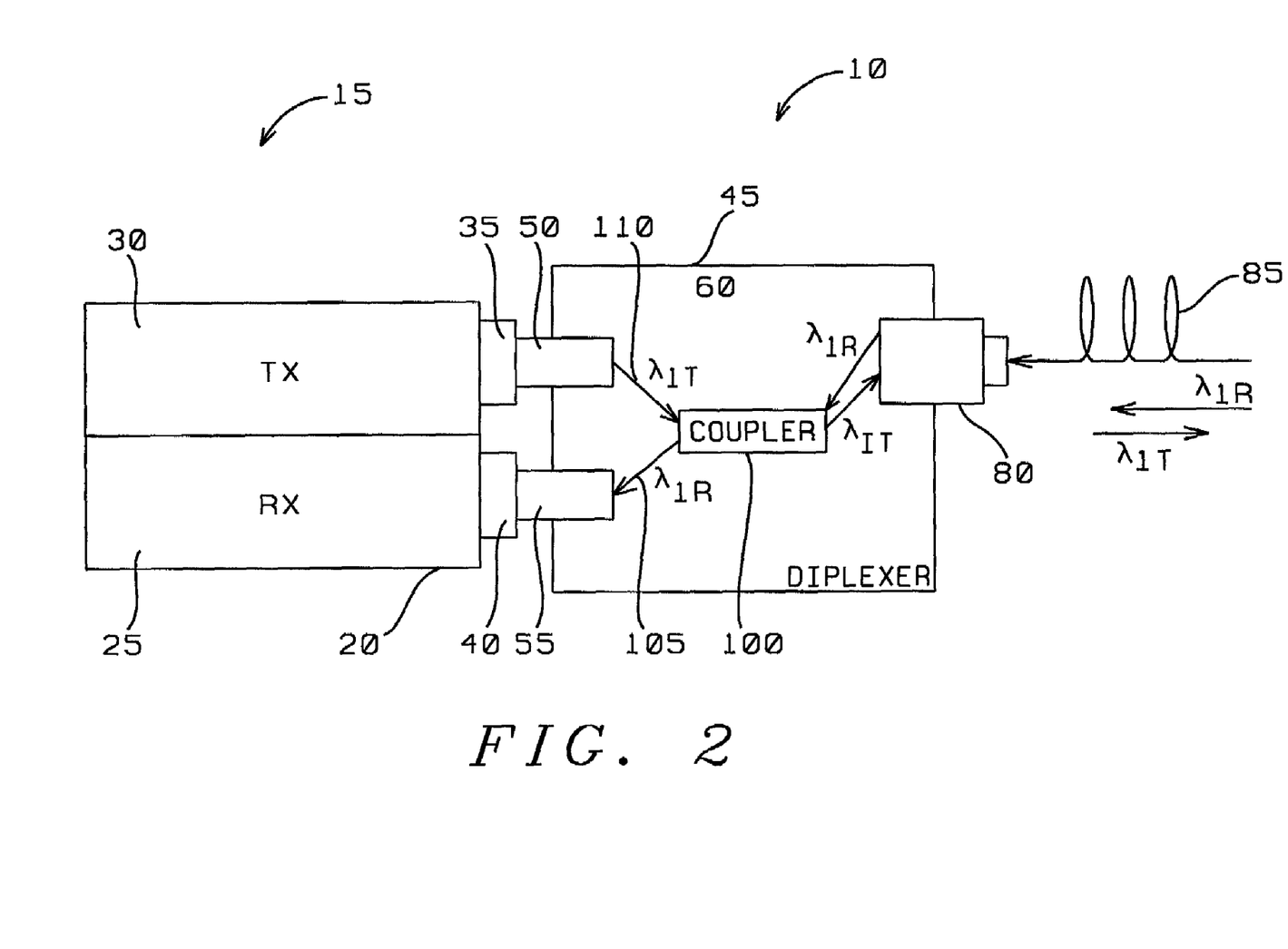
FIG. 2 is a schematic diagram illustrating a second embodiment a diplexer of this invention.

Referring to FIG. 2, the small form factor pluggable transceiver module 15 may be configured to transmit and the receive the light signals having the same wavelength. In the case of the current wavelengths this means that the transmitter 30 and the receiver 25 both operate at either 1310 nm or 1550 nm. In the second embodiment of the diplexer, as shown in FIG. 2, the connectors 50 and 55 are respectively connected to the connectors 35 and 40. The coupler 100 is a fused optical coupler that is used to split optical signals between two fibers, or to combine optical signals from two fibers into one fiber. The optical coupler 100 is constructed by fusing and tapering two fibers together.

The transmitted light signal $\lambda_{1T}$ 110 is conveyed from the transmitter 30 through the connectors 35 and 50 to the coupler 100. The coupler 100 transfers the transmitted light signal $\lambda_{1T}$ 110 to the female connector 80 to the fiber optic cable 85. The received light signal $\lambda_{1R}$ 105 is transferred through the female connector 80 to the coupler 100. The coupler 100 directs the light signal $\lambda_{1R}$ 105 through the connectors 55 and 40 to the receiver 25.

Figure 3:
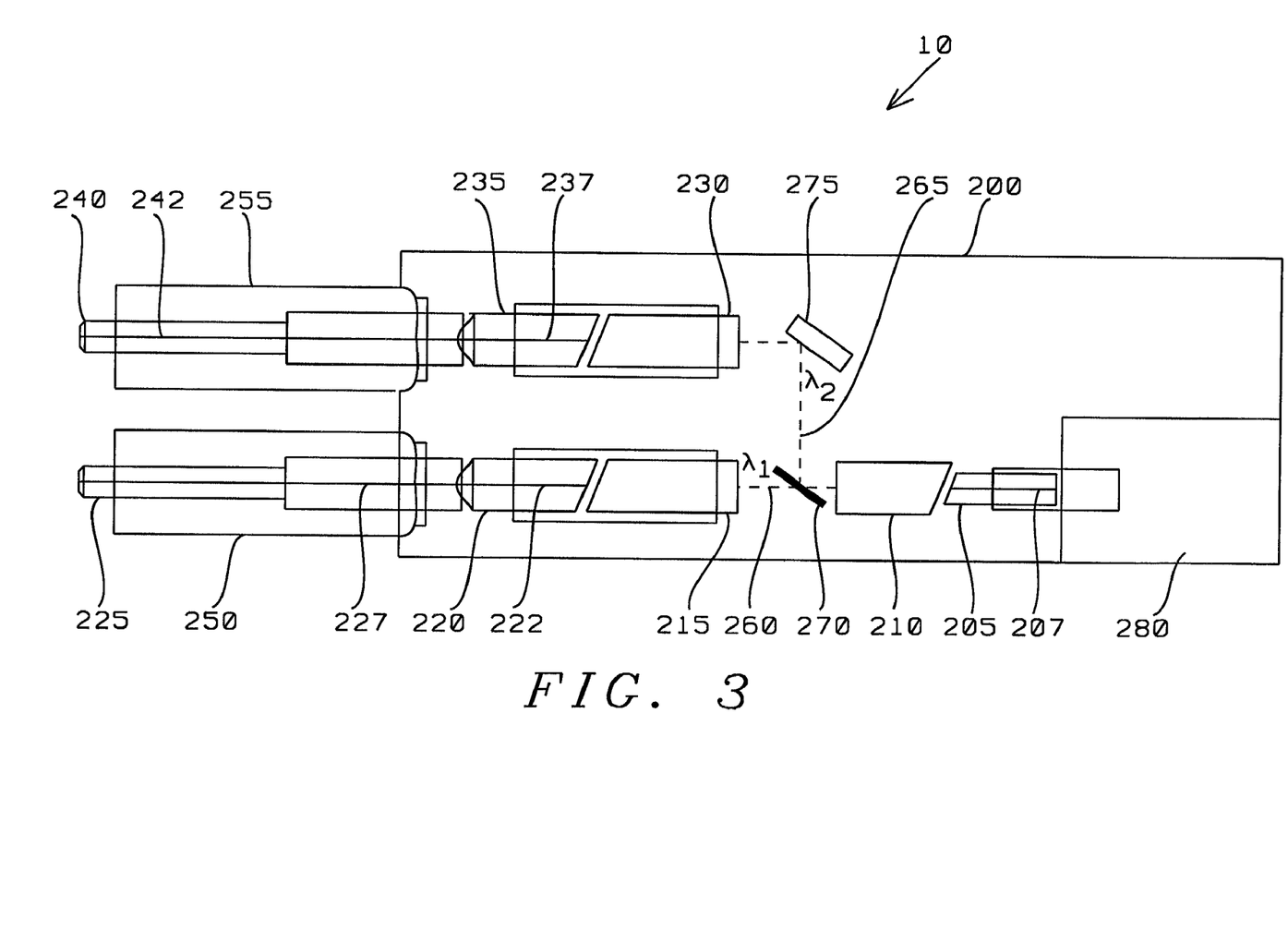
FIG. 3 is a top plan view of a first mode of the first embodiment of the diplexer of this invention.

Refer now to FIG. 3 for a discussion of a physical implementation of a first variation of the first embodiment of the diplexer of this invention. The female connector 280 is secured to the substrate 200 and is structured to receive the connector terminating the near end of the fiber optic cable containing the bi-directional light signals $\lambda_1$ 260 and $\lambda_2$ 265. Linked to the female connector 280 is a ferrule 205. The ferrule 205 is a component (usually a rigid tube) used to align and protect the stripped end of a fiber optic core 207. A ferrule is used together with the female connector 280 that connects to the connector terminating the end of the fiber cable. The ferrule 205 keeps the fiber optic cores accurately aligned within the connector. Ferrules can be made of glass, plastic, metal, or ceramic material. The ferrule 205 is attached to the substrate 200.

A graded index lens 210 is attached to the substrate and aligned to the ferrule 205 to allow transfer of the light signals $\lambda_1$ 260 and $\lambda_2$ 265 from and to the female connector 280. The graded index lens 210 concentrates or focuses the light signals $\lambda_1$ 260 and $\lambda_2$ 265 from the optical filter 270 to the ferrule 205 and from the ferrule 205 to the optical filter 270.

The optical filter 270 is mounted to the substrate 200 and is constructed to be transmissive to the wavelength of the light signal $\lambda_1$ 260 and reflective to the wavelength to the light signal $\lambda_2$ 265. The light signal $\lambda_1$ 260 is transferred through the optical filter 270 from the graded index lens 215. The graded index lens 215 is mounted to the substrate and aligned to transfer the light signal $\lambda_1$ 260 to the optical filter 270. The ferrule 220 containing the fiber optical core 222 is attached to the substrate 200 and functions as described for the ferrule 205. The ferrule 220 is aligned to a second ferrule 225 containing the fiber optical core 227. The ferrule 225 is a component part of the connector 250 and transfers the light signal $\lambda_1$ 260 from the transmitter through the filter 270 and ultimately to the fiber optic cable.

The light signal $\lambda_2$ 265 is reflected from the filter 270 to the mirror 275. The mirror 275 is attached to the substrate 200 and is aligned and oriented with the filter 270 such that the light signal $\lambda_2$ 265 is transferred from the female connector 280 through the ferrule 205 and the graded index lens 210 to be reflected from the filter 270 to the mirror 275. The light signal $\lambda_2$ 265 is then reflected from the mirror 275 to the graded index lens 230.

The graded index lens 230 is attached to the substrate 200 and placed adjacent to the ferrule 235, which contains the fiber optic core 237. The graded index lens 230 concentrates or focuses the light signal $\lambda_2$ 265 to the fiber optic core 237 of the ferrule 235. The ferrule 235 is secured to the substrate 200 and adjoins the ferrule 240, which contains the fiber optic core 242. The fiber optic cores 237 and 242 are aligned to allow transference of the light signal $\lambda_2$ 265. The ferrule 240 is a component part of the connector 255 for linking with the connector of the small form factor pluggable transceiver module. The connector 255 is attached to the substrate 200.

Figure 4:
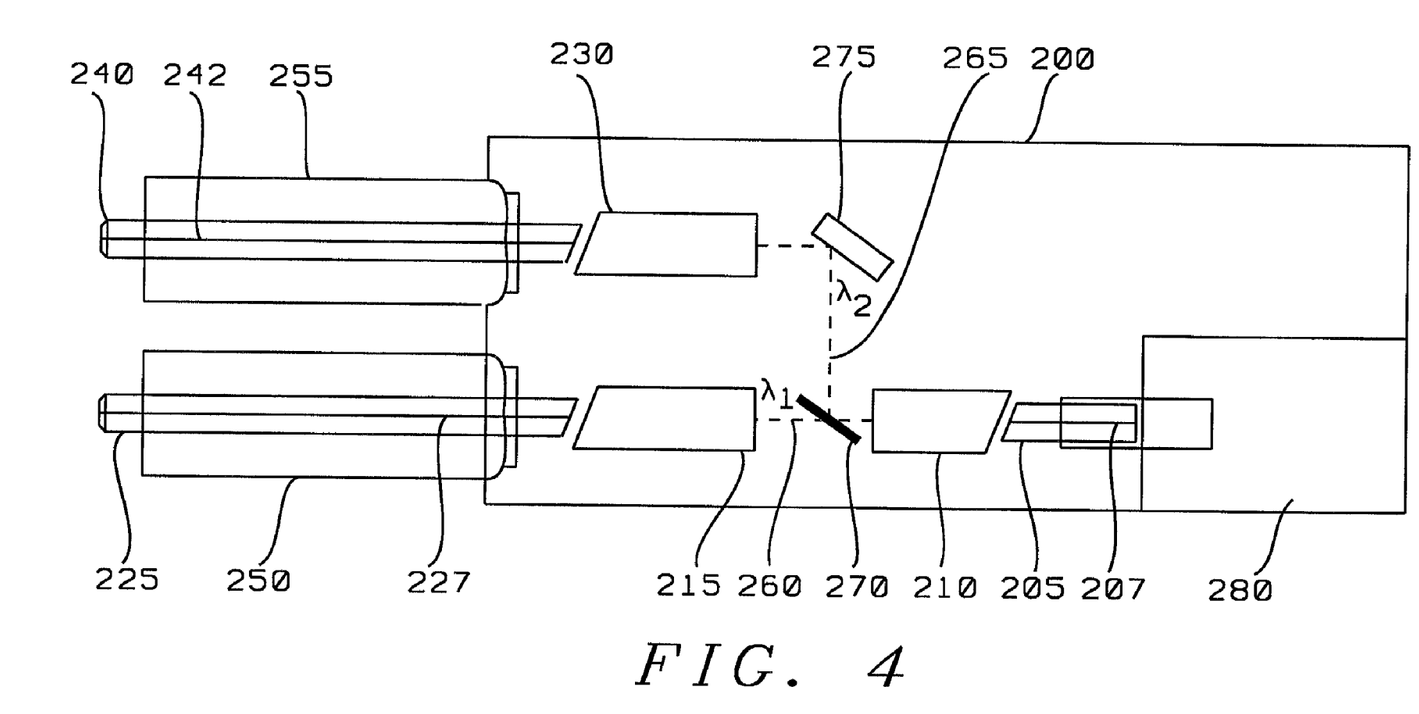
FIG. 4 is a top plan view of a second mode of the first embodiment of the diplexer of this invention.

A second variation of the first embodiment of the diplexer of this invention, as shown in FIG. 4, excludes the ferrules 220 and 235 with their enclosed fiber optic cores 222 and 237. The graded index lens 215 is now attached to the substrate 200 adjacent to the ferrule 225 and aligned to receive the light signal $\lambda_1$ 260 from the fiber optic core 227. This allows the light signal $\lambda_1$ 260 to be transferred from the fiber optic cable through the connector 250 to the filter 270. The light signal $\lambda_1$ 260, as described above is transmitted through the filter 270, the graded index lens 210, the ferrule 205, and female connector 280.

The graded index lens 230 is attached to the substrate 200 and situated adjacent to the ferrule 240 and aligned such that the light signal $\lambda_2$ 265 is concentrated on the fiber optic core 242. Thus the light signal $\lambda_2$ 265 is transferred from the female connector 280 to the filter 270 as described above. The light signal $\lambda_2$ 265 is then reflected to the mirror 275 to the graded index lens 230 for concentration to the fiber optic core 242.

The ferrules 205, 225, and 240 in the first and second variations of the first embodiment of the diplexer of this invention are ceramic ferrules. The ferrules 220 and 235 are glass ferrules. The ceramic ferrules employed for the ferrules 205, 225, and 240 are chosen for their strength and durability. The ferrules 205, 225, and 240 are to respectively components of the female connector 280 and connectors 250 and 255 and will be mating with the connectors of the transceiver module 15 and the female connector 80 of the fiber optic cable 85 of FIG. 1. The ferrules 220 and 235 to retain the graded index lens 215 and 230 and do not require the strength of the ceramic ferrule and thus may use the more economical glass ferrule. It is in keeping with the intent of this invention that the ferrules be constructed of any suitable material.

Figure 5:
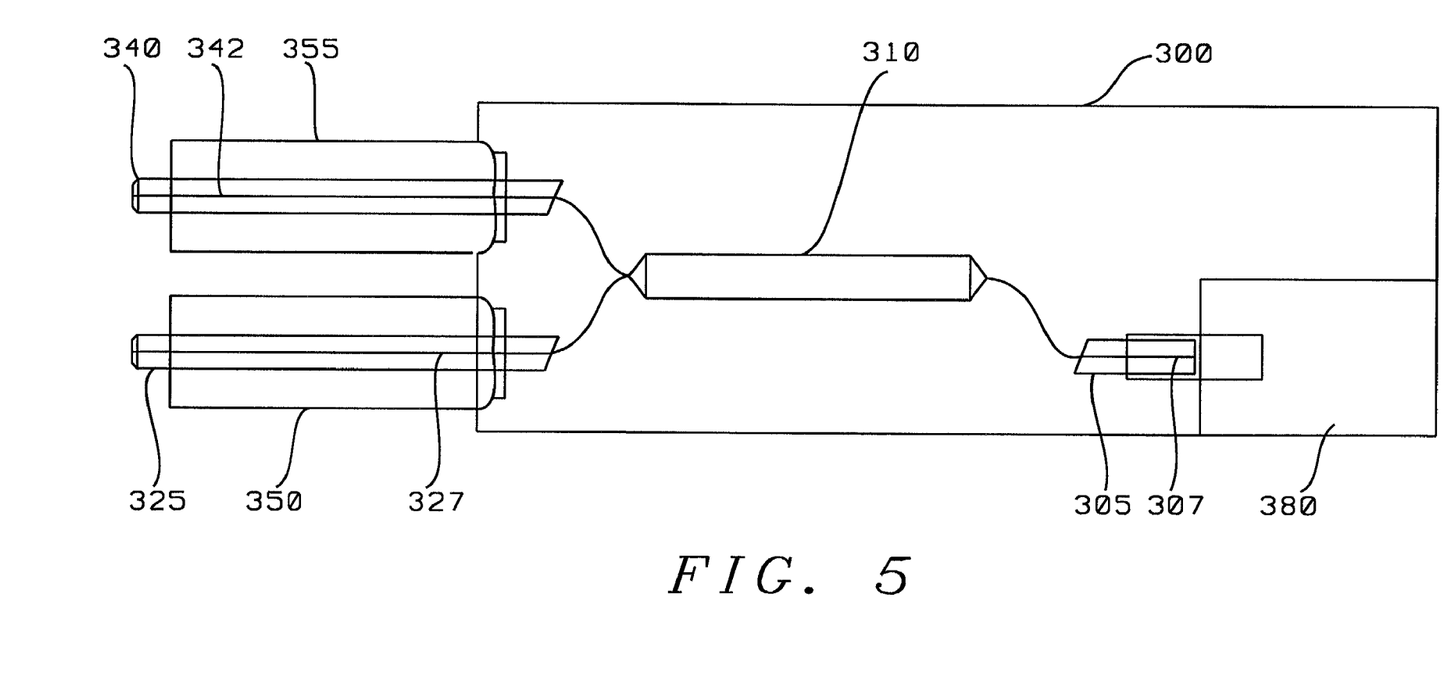
FIG. 5 is a top plan view of the second embodiment of the diplexer of this invention.
Figure 6A:
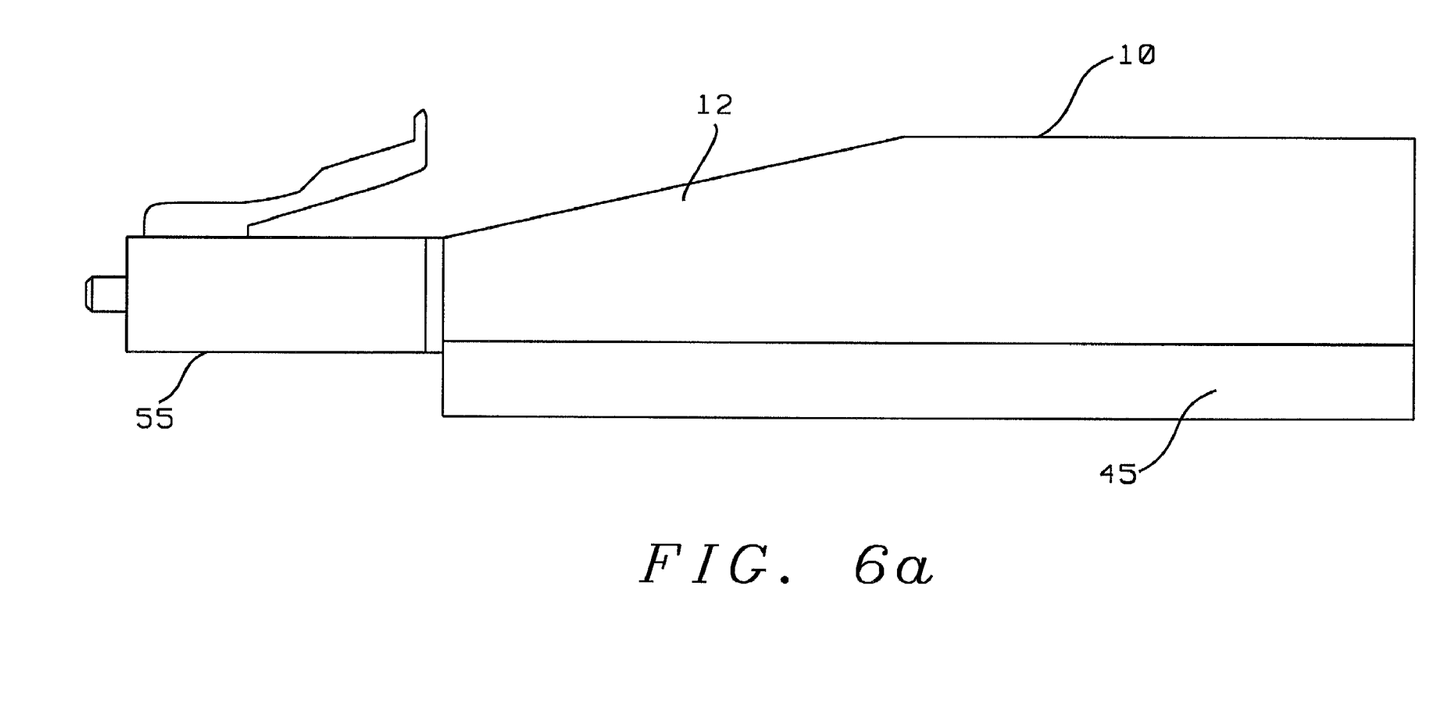
FIGS. 6a–6d are respectively the front, top, left side, and right side plan views of the packaged diplexer of this invention.
Figure 6B:
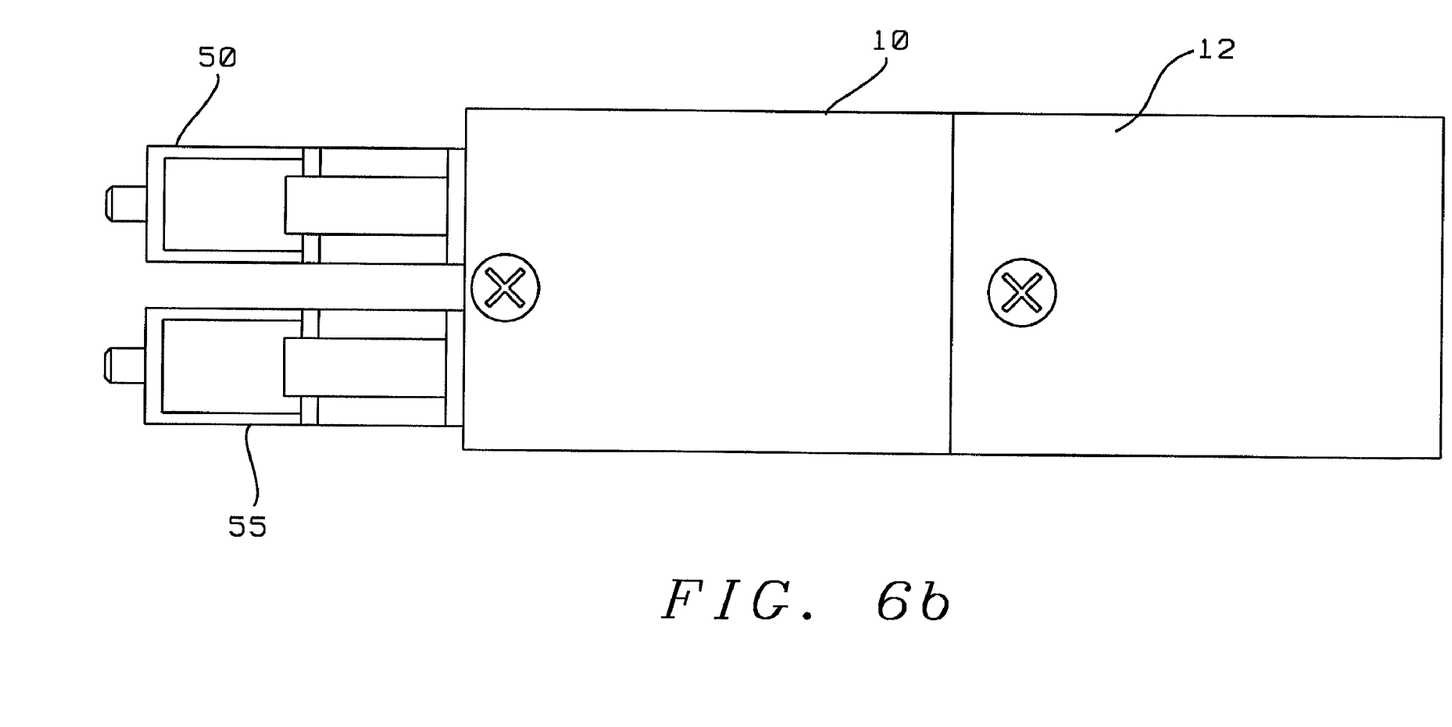
Figure 6C:
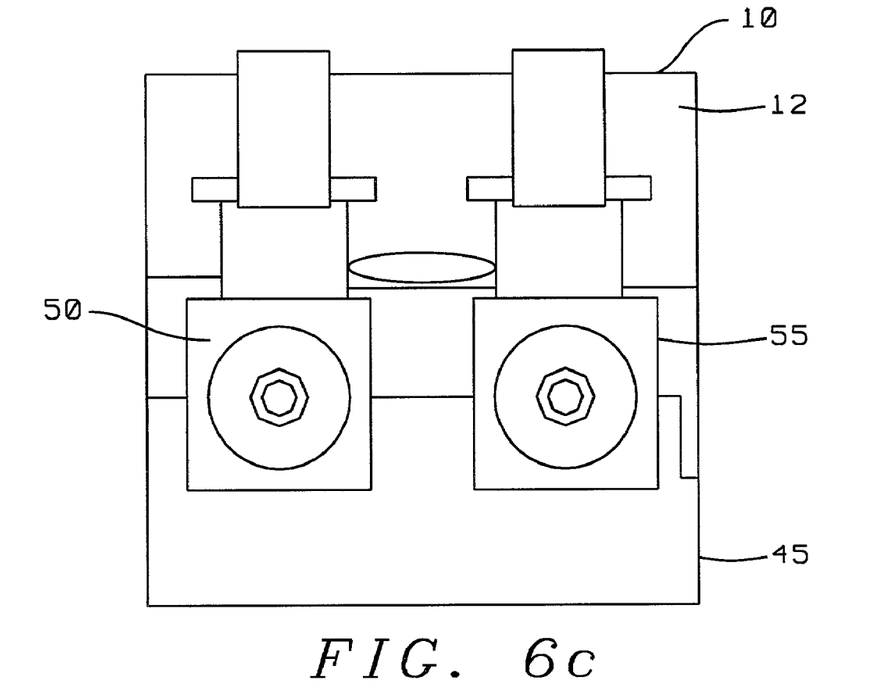
Figure 6D:
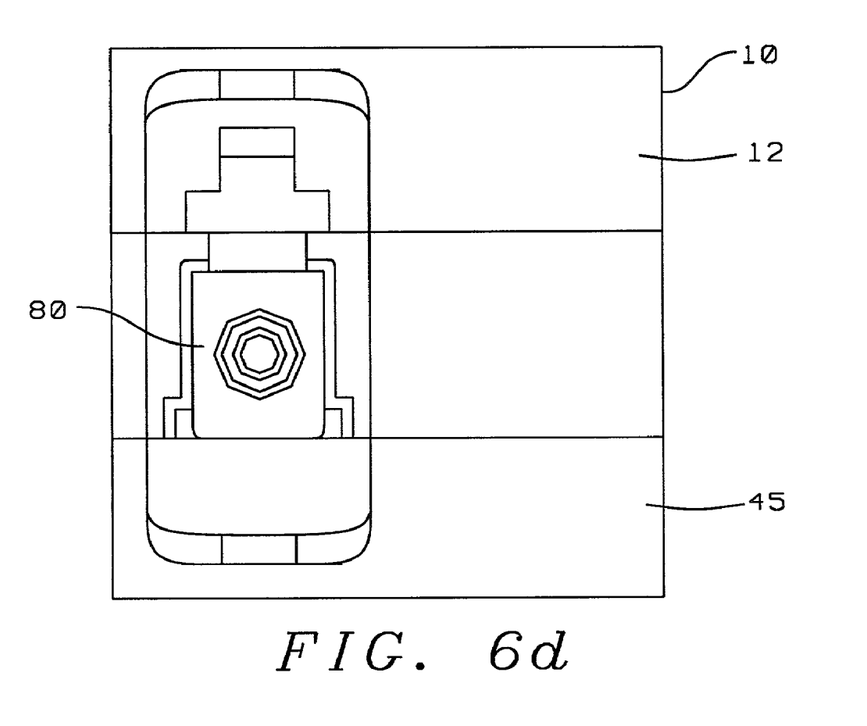

The second embodiment of the diplexer of this invention, as shown in FIG. 5, has a substrate 300 onto which a female connector 380 is attached. The female connector 380 receives the terminating end of the fiber optic cable having the bi-directional light signals $\lambda_1$ 110 and $\lambda_2$ 105 of FIG. 2. Affixed to the substrate 300 and the female connector 380 is the ferrule 305. The ferrule 305 has the fiber optic core 307 that extends from the ferrule 305 to the coupler 310, which is a fused optical coupler that functions as the coupler 100 of FIG. 2.

The connector 350 has as a component the ferrule 325 containing the fiber optic core 327. The connector 350 is connected to the transmitter 30 of FIG. 2 and conveys the light signal light signal $\lambda_{1T}$ 110 through the fiber optic core 327 to the coupler 310. Similarly, the light signal $\lambda_{1R}$ 105 is conveyed from the fiber optic cable connected to the female connector 380 to through coupler to the fiber optic core 342. The fiber optic core 342 is contained in the ferrule 340 and extended to connect to the coupler 310. The ferrule 340 is a component of the connector 355 that is connected to the receiver 25 of FIG. 2. The light signal $\lambda_{1R}$ 105 is propagated through the fiber core 342 and is received by the receiver 25 of FIG. 2.

The ferrules 305, 325, and 340 of the second embodiment of the diplexer of this invention are ceramic ferrules.

The first embodiment of the diplexer of this invention illustrates the splitting and combining of two bi-directional light signals of different wavelengths. It is in keeping with the intention of this invention that the two bi-directional light signals of the first embodiment of this invention may have the same wavelength and perform similarly to that shown in FIG. 2. Similarly the second embodiment of the diplexer of this invention illustrates the combining and splitting of two bi-directional light signal of the same wavelength. It too is in keeping with the intent of this invention that the two bi-directional signals of the second embodiment of this invention may have different wave lengths and perform similarly to that shown in FIG. 1.

Refer now to FIGS. 6a–6d for a description of the packaged diplexer 10 of this invention. The substrate 45 onto which the components of the diplexer 10 are mounted has a covering 12 secured to prevent dust and contamination from impacting on the components of the diplexer 12. The connectors 50 and 55 are structured for plugging into the small form factor pluggable transceiver module 15 of FIGS. 1 and 2. The female connector 80 is designed to accept the terminating connector of the fiber optic cable 85 of FIGS. 1 and 2.

The connectors 50 and 55 and female connector 80 are constructed of any suitable connector form factor, which is determined by the terminating end of the fiber optic cable and the connectors of the small form factor pluggable transceiver module. Generally the connectors are the types generally employed within the optical communications industry. The preferable connectors are the types LC, MT-RJ, MU, and the SC known in the art.

While this invention has been particularly shown and described with reference to the preferred embodiments thereof, it will be understood by those skilled in the art that various changes in form and details may be made without departing from the spirit and scope of the invention.

The invention claimed is:

1. A fiber optical signal separating/combining apparatus constructed on a substrate for plugging to connectors of an optical transmitter/receiver to multiplex/demultiplex a bi-directional light signal into individual incoming and outgoing light signals, said fiber optical signal separating/combining apparatus comprising:
    a female connector adhered to said substrate such that said female connector receives, aligns, and protects a near-end terminating connector of a fiber optic cable conveying the bi-directional light signal;
    a light signal separating/combining device connected to the first female connector to multiplex/demultiplex the bi-directional light signal into the individual incoming and outgoing light signals, wherein said bi-directional light signal is one wavelength and said incoming and outgoing light signals are separate light signals of said one wavelength, wherein the light signal separation apparatus comprises:
        a fused optical coupler affixed to said substrate and having a first port connected to the female connector to convey the bi-directional light signal of said one wavelength, a second port connected to transmit the incoming light signal of said one wavelength to said optical receiver from the female connector and thus from said fiber optic cable, a third port connected to transmit an outgoing light signal of said one wavelength from said optical transmitter to said female connector and thus to said fiber optic cable, and a fused optical multiplexing/demultiplexing coupler connected between the first, second and third ports to direct the incoming light signal from the first port to the second port and to direct the outgoing light from the third port to the first port to provide bi-directional communications in said one wavelength; and
    a plurality of paired connectors attached to said substrate for plugging to said optical transmitter/receiver and in connection with a termination connector of an optical transmitter of said optical transmitter/receiver and in connection with a termination connector of an optical receiver of said optical transmitter/receiver, such that a first of said paired connectors is placed in said termination connector of said optical transmitter to transfer said outgoing light signal to said third port for transfer to said first port and thence to said female connector and a second of said paired connectors is placed in said termination connector of said optical receiver to align and protect said second of said paired connectors that convey said individual incoming light signals from said female connector to said first port and thence to said second port to said optical receiver.

2. The fiber optic signal separating/combining apparatus of claim 1 further comprising a ferrule containing a fiber optic core placed between the female connector and said light separating/combining device for accurately aligning said fiber optic core with said fiber optic cable within said near-end terminating connector for conveying the bi-directional light signal to said light separating/combining device.

3. A fiber optical diplexer formed on a substrate for plugging to connectors of an optical transmitter/receiver to multiplex/demultiplex a bi-directional light signal into individual incoming and outgoing light signals comprising:
    a female connector adhered to said substrate such that said female connector receives, aligns, and protects a near-end terminating connector of a fiber optic cable conveying the bi-directional light signal;
    a light signal separating/combining apparatus connected to the female connector to multiplex/demultiplex the bi-directional light signal into the individual incoming and outgoing light signals, wherein said bi-directional light signal is one wavelength and said incoming and outgoing light signals are separate light signals of said one wavelength, wherein the light signal separation apparatus comprises:
        a fused optical coupler affixed to said substrate and having a first port connected to the female connector to convey the bi-directional light signal of said one wavelength, a second port connected to transmit the incoming light signal of said one wavelength to said optical receiver from the female connector and thus from said fiber optic cable, a third port connected to transmit an outgoing light signal of said one wavelength from said optical transmitter to said female connector and thus to said fiber optic cable, and a fused optical multiplexing/demultiplexing coupler connected between the first, second and third ports to direct the incoming light signal from the female connector to the second connector and to direct the outgoing light from the third connector to the first connector to provide bi-directional communications in said one wavelength;

a receiver connector attached to said substrate and placed in one of a plurality of termination connector receivers in communication with an optical receiver of said optical transmitter/receiver that align and protect said receiver connector that conveys said incoming light signals; and a transmitter connector attached to said substrate and placed in one of a plurality of termination connector receivers in communication with an optical transmitter of said optical transmitter/receiver that align and protect said transmitter connector that conveys said outgoing light signal.

4. The fiber optic diplexer of claim 2 further comprising a ferrule containing a fiber optic core, said ferrule placed between the first connector and said light separation device for accurately aligning said fiber optic core with said fiber optic cable within said near-end terminating connector for conveying to align the bi-directional light signal between the fiber optic cable through the female connector to said light separation device.

5. A method for multiplexing/demultiplexing light signals of a grouping of bi-directional light signals into a plurality of individual incoming and outgoing unidirectional light signals, comprising the steps of:

providing a female connection portal mounted upon a substrate that receives, aligns, and protects a terminating connector of a fiber optic cable for transferring said bi-directional light signals to convey the grouping of bi-directional light signals, wherein said bi-directional light signals are one wavelength and said incoming and outgoing unidirectional light signals are separate light signals of said one wavelength;

providing a plurality of connection portals mounted upon said substrate;

placing a first of said connection portals in one of a plurality of termination connectors in communication with an optical transmitter device;

placing a second of said connection portals in one of a plurality of termination connectors in communication with an optical receiver device;

wherein said plurality of termination connectors in communication with said optical transmitter device align and protect said first of said connection portals for conveying one of the individual outgoing unidirectional light signals to said transmitter and said plurality of termination connectors in communication with said optical receiver device align and protect said second of said connection portals for conveying one of the individual incoming unidirectional light signals to said receiver;

steering the grouping of bi-directional signals through a fused optical multiplexing/demultiplexing coupler to transfer an incoming light signal of said bi-directional light signals to said second of said connection portals and to transfer a outgoing light signal from said transmitter through said first of said connection portal to said female connector as an outgoing light signal of said bi-directional light signals to provide bi-directional communications in said one wavelength.

6. The method of claim 5 further comprising the step of converging the grouping of bi-directional signals, as said grouping of bi-directional light signals arrive at the female connection portal.

7. The method of claim 5 further comprising the step of converging each of the incoming or outgoing signals through a graded index lens as said incoming or outgoing unidirectional signals are steered to or from said connection portals.

8. The method of claim 5 wherein the female connection portal comprises a first ferrule containing a fiber optic core for accurately aligning said fiber optic core with said fiber optic cable within said near-end terminating connector for conveying the bi-directional light signal to said fused coupler.

9. The method of claim 5 wherein the connection portals comprise a plurality of second ferrules, each ferrule containing a fiber optic core and each ferrule for aligning the individual incoming or outgoing light signals and to said fused coupler.

* * * * *